(12) United States Patent
Raghavan et al.

(10) Patent No.: US 7,261,659 B2
(45) Date of Patent: Aug. 28, 2007

(54) ELECTRICALLY VARIABLE TRANSMISSION HAVING TWO PLANETARY GEARSETS

(75) Inventors: Madhusudan Raghavan, West Bloomfield, MI (US); Norman K. Bucknor, Troy, MI (US); James D. Hendrickson, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 235 days.

(21) Appl. No.: 11/112,130

(22) Filed: Apr. 22, 2005

(65) Prior Publication Data

US 2006/0240928 A1   Oct. 26, 2006

(51) Int. Cl.
*F16H 3/72* (2006.01)
*F16H 3/44* (2006.01)

(52) U.S. Cl. .......................... 475/5; 475/284; 475/286; 475/288; 475/303

(58) Field of Classification Search .................... 475/5, 475/280, 282, 284, 286, 288, 290, 303; 180/65.2, 180/65.3, 65.4; 477/3
See application file for complete search history.

(56) References Cited

U.S. PATENT DOCUMENTS

| 5,558,595 A | 9/1996 | Schmidt et al. ................ 477/3 |
| 5,603,671 A * | 2/1997 | Schmidt ......................... 475/5 |
| 5,931,757 A | 8/1999 | Schmidt ......................... 475/2 |
| 6,478,705 B1 | 11/2002 | Holmes et al. ................ 475/5 |
| 6,527,658 B2 | 3/2003 | Holmes et al. ................ 475/5 |
| 7,169,074 B2 * | 1/2007 | Raghavan et al. ............ 475/5 |
| 2006/0052199 A1 * | 3/2006 | Singh et al. ................... 475/5 |
| 2006/0111213 A1 * | 5/2006 | Bucknor et al. ............... 475/5 |
| 2006/0154771 A1 * | 7/2006 | Klemen et al. ................ 475/5 |
| 2006/0223663 A1 * | 10/2006 | Bucknor et al. ............... 475/5 |

* cited by examiner

*Primary Examiner*—Roger Pang

(57) ABSTRACT

The electrically variable transmission family of the present invention provides low-content, low-cost electrically variable transmission mechanisms including first and second differential gear sets, a battery, two electric machines serving interchangeably as motors or generators, and five selectable torque-transfer devices (two clutches and three brakes). The selectable torque transfer devices are engaged singly or in combinations of two or three to yield an EVT with a continuously variable range of speeds (including reverse) and up to three mechanically fixed forward speed ratios. The torque transfer devices and the first and second motor/generators are operable to provide five operating modes in the electrically variable transmission, including battery reverse mode, EVT reverse mode, reverse and forward launch modes, continuously variable transmission range mode, and fixed ratio mode.

14 Claims, 8 Drawing Sheets

| | RATIOS | 50 | 52 | 54 | 80/55 | 82/57 |
|---|---|---|---|---|---|---|
| Batt. Rev. | -2.88 | | | X | 0.00 | -1.00(M) |
| EVT Rev. | -8.33 | | X | X | -0.35 | -3.55(M) |
| TC Rev. | -7.00 | | X | X | -0.35 | -3.09(M) |
| TC For. | 4.69 | | X | X | -0.35 | 0.98(M) |
| Range 1.1 | 4.69 | | X | X | -0.35 | 0.98(M) |
| Range 1.2 | 3.45 | | X | X | -0.35 | 0.54(M) |
| Range 1.3 | 2.53 | | X | X | -0.35 | 0.23(M) |
| Range 1.4 | 1.86 | | X | X | -0.35 | 0.00(M) |
| Range 2.1 | 1.36 | X | X | | 0.54(M) | 0.00 |
| Range 2.2 | 1.00 | X | X | | 0.30(M) | -0.18 |
| Range 2.3 | 0.74 | X | X | | 0.14(M) | -0.39 |
| Range 2.4 | 0.54 | X | X | | 0.00(M) | -0.47 |
| F1 | 1.88 | | X | X | X | |
| F2 | 0.53 | X | | X | | X |

Dual Mode (CS)    (X = ENGAGED CLUTCH)

SAMPLE DESIGN:

$$\frac{\text{RING GEAR}}{\text{SUN GEAR}} \text{ TOOTH RATIO:}$$

$$\frac{N_{R1}}{N_{S1}} = 1.88$$

$$\frac{N_{R2}}{N_{S2}} = 1.88$$

| FIXED-RATIO MODE | |
|---|---|
| RATIO SPREAD | 3.55 |
| RATIO STEPS | |
| 1/2 | 3.55 |

| | RATIOS | 150 | 152 | 154 | 180/155 | 182/157 |
|---|---|---|---|---|---|---|
| Batt. Rev. | -1.50 | | | X | 0.00 | -1.00(M) |
| EVT Rev. | -8.33 | | X | X | -0.25 | -5.55(M) |
| TC Rev. | -7.00 | | X | X | -0.25 | -4.67(M) |
| TC For. | 4.69 | | X | X | -0.25 | 3.13(M) |
| Range 1.1 | 4.69 | | X | X | -0.25 | 3.13(M) |
| Range 1.2 | 3.45 | | X | X | -0.25 | 2.29(M) |
| Range 1.3 | 2.53 | | X | X | -0.25 | 1.69(M) |
| Range 1.4 | 1.86 | | X | X | -0.25 | 1.24(M) |
| Range 2.1 | 1.36 | X | X | | -0.15 | 0.51(M) |
| Range 2.2 | 1.00 | X | X | | -0.11 | 0.11(M) |
| Range 2.3 | 0.74 | X | X | | -0.08(M) | -0.18 |
| Range 2.4 | 0.54 | X | X | | -0.06(M) | -0.30 |
| F1 | 2.24 | | X | X | X | |
| F2 | 1.50 | X | | | X | X |
| F3 | 0.90 | X | X | | X | |

Dual Mode (HS)    (X = ENGAGED CLUTCH)

SAMPLE DESIGN:

$\dfrac{\text{RING GEAR}}{\text{SUN GEAR}}$ TOOTH RATIO:

$$\dfrac{N_{R1}}{N_{S1}} = 2.93$$

$$\dfrac{N_{R2}}{N_{S2}} = 2.00$$

| FIXED-RATIO MODE | |
|---|---|
| RATIO SPREAD | 2.49 |
| RATIO STEPS | |
| 1/2 | 1.49 |
| 2/3 | 1.67 |

| | RATIOS | 250 | 252 | 254 | 280/255 | 282/257 |
|---|---|---|---|---|---|---|
| Batt. Rev. | -3.00 | | | X | 0.00 | -1.00(M) |
| EVT Rev. | -8.33 | | X | X | -0.25 | -3.52(M) |
| TC Rev. | -7.00 | | X | X | -0.25 | -3.08(M) |
| TC For. | 4.69 | | X | X | -0.25 | 0.82(M) |
| Range 1.1 | 4.69 | | X | X | -0.25 | 0.82(M) |
| Range 1.2 | 3.45 | | X | X | -0.25 | 0.40(M) |
| Range 1.3 | 2.53 | | X | X | -0.25(M) | 0.10 |
| Range 1.4 | 1.86 | | X | X | -0.25(M) | -0.13 |
| Range 2.1 | 1.36 | X | X | | -0.02 | 0.38(M) |
| Range 2.2 | 1.00 | X | X | | -0.08 | 0.08(M) |
| Range 2.3 | 0.74 | X | X | | -0.13(M) | -0.13 |
| Range 2.4 | 0.54 | X | X | | -0.16(M) | -0.30 |
| F1 | 2.24 | | X | X | X | |
| F2 | 1.50 | X | | | X | X |
| F3 | 0.90 | X | X | | X | |

Dual Mode (HS)  (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 2.93$ $\frac{N_{R2}}{N_{S2}} = 3.00$

| FIXED-RATIO MODE | |
|---|---|
| RATIO SPREAD | 2.82 |
| RATIO STEPS | |
| 1/2 | 1.49 |
| 2/3 | 1.67 |

| | RATIOS | 350 | 352 | 354 | 380/355 | 382/357 |
|---|---|---|---|---|---|---|
| Batt. Rev. | -3.50 | | | X | 0.00 | -1.00(M) |
| EVT Rev. | -8.33 | | X | X | -0.25 | -3.13(M) |
| TC Rev. | -7.00 | | X | X | -0.25 | -2.75(M) |
| TC For. | 4.69 | | X | X | -0.25 | 0.59(M) |
| Range 1.1 | 4.69 | | X | X | -0.25 | 0.59(M) |
| Range 1.2 | 3.45 | | X | X | -0.25 | 0.24(M) |
| Range 1.3 | 2.53 | | X | X | -0.25(M) | -0.02 |
| Range 1.4 | 1.86 | | X | X | -0.25(M) | -0.21 |
| Range 2.1 | 1.36 | X | X | | -0.01 | 0.37(M) |
| Range 2.2 | 1.00 | X | X | | -0.07 | 0.07(M) |
| Range 2.3 | 0.74 | X | X | | -0.12(M) | -0.14 |
| Range 2.4 | 0.54 | X | X | | -0.16(M) | -0.30 |
| F1 | 2.61 | | X | X | X | |
| F2 | 1.40 | X | | | X | X |
| F3 | 0.91 | X | | | X | |

Dual Mode (HS)   (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 2.93$ $\dfrac{N_{R2}}{N_{S2}} = 2.50$

| FIXED-RATIO MODE | |
|---|---|
| RATIO SPREAD | 2.87 |
| RATIO STEPS | |
| 1/2 | 1.86 |
| 2/3 | 1.54 |

| | RATIOS | 450 | 452 | 454 | 480/455 | 482/457 |
|---|---|---|---|---|---|---|
| Batt. Rev. | -3.50 | | | X | 0.00 | -1.00(M) |
| EVT Rev. | -8.33 | | X | X | -5.96(M) | -3.13 |
| TC Rev. | -7.00 | | X | X | -5.00(M) | -2.75 |
| TC For. | 4.69 | | X | X | 3.35 | 0.59(M) |
| Range 1.1 | 4.69 | | X | X | 3.35 | 0.59(M) |
| Range 1.2 | 3.45 | | X | X | 2.46 | 0.24(M) |
| Range 1.3 | 2.53 | | X | X | 1.81(M) | -0.02 |
| Range 1.4 | 1.86 | | X | X | 1.33(M) | -0.21 |
| Range 2.1 | 1.36 | X | X | | -0.03(M) | 0.39 |
| Range 2.2 | 1.00 | X | X | | -0.29 | 0.29(M) |
| Range 2.3 | 0.74 | X | X | | -0.47 | 0.21(M) |
| Range 2.4 | 0.54 | X | X | | -0.61 | 0.15(M) |
| F1 | 2.61 | | X | X | X | |
| F2 | 1.40 | X | | | X | X |
| F3 | 0.91 | X | X | | X | |

Dual Mode (HS)     (X = ENGAGED CLUTCH)

SAMPLE DESIGN:

$$\frac{\text{RING GEAR}}{\text{SUN GEAR}} \text{ TOOTH RATIO:}$$

$$\frac{N_{R1}}{N_{S1}} = 2.93$$

$$\frac{N_{R2}}{N_{S2}} = 2.50$$

| FIXED-RATIO MODE | |
|---|---|
| RATIO SPREAD | 2.87 |
| RATIO STEPS | |
| 1/2 | 1.86 |
| 2/3 | 1.54 |

| | RATIOS | 550 | 552 | 554 | 580/555 | 582/557 |
|---|---|---|---|---|---|---|
| Batt. Rev. | -3.50 | | | X | 0.00 | -1.00(M) |
| EVT Rev. | -8.33 | X | X | | -6.95 | -2.38(M) |
| TC Rev. | -7.00 | X | X | | -6.00 | -2.00(M) |
| TC For. | 4.69 | X | X | | 2.35(M) | 1.34 |
| Range 1.1 | 4.69 | X | X | | 2.35(M) | 1.34 |
| Range 1.2 | 3.45 | X | X | | 1.46(M) | 0.98 |
| Range 1.3 | 2.53 | X | X | | 0.81(M) | 0.72 |
| Range 1.4 | 1.86 | X | X | | 0.33(M) | 0.53 |
| Range 1.5 | 1.36 | X | X | | -0.03(M) | 0.39 |
| Range 1.6 | 1.00 | X | X | | -0.29 | 0.29(M) |
| Range 1.7 | 0.74 | X | X | | -0.47 | 0.21(M) |
| Range 1.8 | 0.54 | X | X | | -0.61 | 0.15(M) |
| F1 | 2.61 | | X | X | X | |
| F2 | 1.40 | X | | | X | X |
| F3 | 0.91 | X | X | | X | |

Single Mode     (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 2.93$ $\dfrac{N_{R2}}{N_{S2}} = 2.50$

| FIXED-RATIO MODE | |
|---|---|
| RATIO SPREAD | 2.87 |
| RATIO STEPS | |
| 1/2 | 1.86 |
| 2/3 | 1.54 |

| | RATIOS | 650 | 652 | 654 | 680/655 | 682/657 |
|---|---|---|---|---|---|---|
| Batt. Rev. | -3.50 | | | X | 0.00 | -1.00(M) |
| EVT Rev. | -8.33 | X | X | | -1.77 | -7.56(M) |
| TC Rev. | -7.00 | X | X | | -1.52 | -6.48(M) |
| TC For. | 4.69 | X | X | | 0.60(M) | 3.09 |
| Range 1.1 | 4.69 | X | X | | 0.60(M) | 3.09 |
| Range 1.2 | 3.45 | X | X | | 0.37(M) | 2.07 |
| Range 1.3 | 2.53 | X | X | | 0.21(M) | 1.32 |
| Range 1.4 | 1.86 | X | X | | 0.08(M) | 0.78 |
| Range 1.5 | 1.36 | X | X | | -0.01 | 0.37(M) |
| Range 1.6 | 1.00 | X | X | | -0.07 | 0.07(M) |
| Range 1.7 | 0.74 | X | X | | -0.12(M) | -0.14 |
| Range 1.8 | 0.54 | X | X | | -0.16(M) | -0.30 |
| F1 | 2.61 | | X | X | X | |
| F2 | 1.40 | X | | | X | X |
| F3 | 0.91 | X | X | | X | |

Single Mode (X = ENGAGED CLUTCH)

SAMPLE DESIGN:

$$\frac{\text{RING GEAR}}{\text{SUN GEAR}} \text{ TOOTH RATIO:}$$

$$\frac{N_{R1}}{N_{S1}} = 2.93$$

$$\frac{N_{R2}}{N_{S2}} = 2.50$$

| FIXED-RATIO MODE | |
|---|---|
| RATIO SPREAD | 2.87 |
| RATIO STEPS | |
| 1/2 | 1.86 |
| 2/3 | 1.54 |

| | RATIOS | 750 | 752 | 754 | 780/755 | 782/757 | 792 |
|---|---|---|---|---|---|---|---|
| Batt. Rev. | -3.00 | | | X | 0.00 | -1.00(M) | B |
| EVT Rev. | -8.33 | | X | X | -0.25 | -3.52(M) | B |
| TC Rev. | -7.00 | | X | X | -0.25 | -3.08(M) | B |
| TC For. | 4.69 | | X | X | -0.25 | 0.82(M) | B |
| Range 1.1 | 4.69 | | X | X | -0.25 | 0.82(M) | B |
| Range 1.2 | 3.45 | | X | X | -0.25 | 0.40(M) | B |
| Range 1.3 | 2.53 | | X | X | -0.25 | 0.10(M) | B |
| Range 1.4 | 1.86 | | X | X | -0.25(M) | -0.13 | B |
| Range 2.1 | 1.36 | X | X | | -0.02 | 0.38(M) | A |
| Range 2.2 | 1.00 | X | X | | -0.11 | 0.11(M) | A |
| Range 2.3 | 0.74 | X | X | | -0.08(M) | -0.14 | A |
| Range 2.4 | 0.54 | X | X | | -0.06(M) | -0.30 | A |
| F1 | 2.24 | | X | X | X | | |
| F2 | 1.50 | X | | | X | X | |
| F3 | 0.90 | X | X | | X | | |

Dual Mode (HS)  (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 2.93$ $\frac{N_{R2}}{N_{S2}} = 3.00$

| FIXED-RATIO MODE | |
|---|---|
| RATIO SPREAD | 2.49 |
| RATIO STEPS | |
| 1/2 | 1.49 |
| 2/3 | 1.67 |

ELECTRICALLY VARIABLE TRANSMISSION HAVING TWO PLANETARY GEARSETS

TECHNICAL FIELD

The present invention relates to electrically variable transmissions with selective operation both in power-split variable speed ratio ranges and in fixed speed ratios, and having two planetary gear sets, two motor/generators and five torque transfer devices.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and the emissions of pollutants, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses, as disclosed in U.S. Pat. No. 5,931,757, issued Aug. 3, 1999, to Michael Roland Schmidt, commonly assigned with the present application, and hereby incorporated by reference in its entirety. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators.

Operation in first or second variable-speed-ratio modes of operation may be selectively achieved by using clutches in the nature of first and second torque transfer devices. In the first mode, an input-power-split speed ratio range is formed by the application of the first clutch, and the output speed of the transmission is proportional to the speed of one motor/generator. In the second mode, a compound-power-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output. The transmission incorporates at least one mechanical point in its first mode of operation and at least two mechanical points in its second mode of operation.

U.S. Pat. No. 6,527,658, issued Mar. 4, 2003 to Holmes et al, commonly assigned with the present application, and hereby incorporated by reference in its entirety, discloses an electrically variable transmission utilizing two planetary gear sets, two motor/generators and two clutches to provide input split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, selectively providing an input-power-split speed ratio range and a compound-power-split speed ratio range. One fixed speed ratio can also be selectively achieved.

SUMMARY OF THE INVENTION

The present invention provides a family of electrically variable transmissions offering several advantages over conventional automatic transmissions for use in hybrid vehicles, including improved vehicle acceleration performance, improved fuel economy via regenerative braking and electric-only idling and launch, and an attractive marketing feature. An object of the invention is to provide the best possible energy efficiency and emissions for a given engine. In addition, optimal performance, capacity, package size, and ratio coverage for the transmission are sought.

The electrically variable transmission family of the present invention provides low-content, low-cost electrically variable transmission mechanisms including first and second differential gear sets, a battery, two electric machines serving interchangeably as motors or generators, and five selectable torque-transfer devices (two clutches and three brakes). Preferably, the differential gear sets are planetary gear sets, but other gear arrangements may be implemented, such as bevel gears or differential gearing to an offset axis.

In this description, the first or second planetary gear sets may be counted first to second in any order (i.e., left to right or right to left).

Each of the two planetary gear sets has three members. The first, second or third member of each planetary gear set can be any one of a sun gear, ring gear or carrier, or alternatively a pinion.

Each carrier can be either a single-pinion carrier (simple) or a double-pinion carrier (compound).

The input shaft is continuously connected with at least one member of the planetary gear sets. The output shaft is continuously connected with another member of the planetary gear sets.

A first torque transfer device selectively connects a member of the first planetary gear set with a member of the second planetary gear set.

A second torque transfer device selectively connects a member of the first planetary gear set with a member of the second planetary gear set, this pair of members being different from the ones connected by the first torque transfer device.

A third torque transfer device selectively connects a member of the first or second planetary gear set with a stationary member (ground/transmission case).

A fourth torque transfer device is connected in parallel with one of the motor/generators for selectively preventing rotation of the motor/generator.

A fifth torque transfer device is connected in parallel with the other of the motor/generators for selectively preventing rotation thereof.

The first motor/generator is mounted to the transmission case (or ground) and is continuously connected to a member of the first or second planetary gear set.

The second motor/generator is mounted to the transmission case and is continuously connected to a member of the second planetary gear set, this member being different from the one continuously connected to the first motor/generator.

The five selectable torque transfer devices (two clutches and three brakes) are engaged singly or in combinations of two or three to yield an EVT with a continuously variable range of speeds (including reverse) and up to three mechanically fixed forward speed ratios. A "fixed speed ratio" is an operating condition in which the mechanical power input to the transmission is transmitted mechanically to the output, and no power flow (i.e. almost zero) is present in the motor/generators. An electrically variable transmission that may selectively achieve several fixed speed ratios for operation near full engine power can be smaller and lighter for a given maximum capacity. Fixed ratio operation may also result in lower fuel consumption when operating under conditions where engine speed can approach its optimum without using the motor/generators. A variety of fixed speed ratios and variable ratio spreads can be realized by suitably selecting the tooth ratios of the planetary gear sets.

Each embodiment of the electrically variable transmission family disclosed has an architecture in which neither the transmission input nor output is directly connected to a motor/generator. This allows for a reduction in the size and cost of the electric motor/generators required to achieve the desired vehicle performance.

The torque transfer devices, and the first and second motor/generators are operable to provide five operating modes in the electrically variable transmission, including battery reverse mode, EVT reverse mode, reverse and forward launch modes, continuously variable transmission range mode, and fixed ratio mode.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including an electrically variable transmission incorporating a family member of the present invention;

FIG. 1b is an operating mode table and fixed ratio mode table depicting some of the operating characteristics of the powertrain shown in FIG. 1a;

FIG. 2a is a schematic representation of a powertrain having an electrically variable transmission incorporating another family member of the present invention;

FIG. 2b is an operating mode table and fixed ratio mode table depicting some of the operating characteristics of the powertrain shown in FIG. 2a;

FIG. 3a is a schematic representation of a powertrain having an electrically variable transmission incorporating another family member of the present invention;

FIG. 3b is an operating mode table and fixed ratio mode table depicting some of the operating characteristics of the powertrain shown in FIG. 3a;

FIG. 4a is a schematic representation of a powertrain having an electrically variable transmission incorporating another family member of the present invention;

FIG. 4b is an operating mode table and fixed ratio mode table depicting some of the operating characteristics of the powertrain shown in FIG. 4a;

FIG. 5a is a schematic representation of a powertrain having an electrically variable transmission incorporating another family member of the present invention;

FIG. 5b is an operating mode table and fixed ratio mode table depicting some of the operating characteristics of the powertrain shown in FIG. 5a;

FIG. 6a is a schematic representation of a powertrain having an electrically variable transmission incorporating another family member of the present invention;

FIG. 6b is an operating mode table and fixed ratio mode table depicting some of the operating characteristics of the powertrain shown in FIG. 6a;

FIG. 7a is a schematic representation of a powertrain having an electrically variable transmission incorporating another family member of the present invention;

FIG. 7b is an operating mode table and fixed ratio mode table depicting some of the operating characteristics of the powertrain shown in FIG. 7a;

FIG. 8a is a schematic representation of a powertrain having an electrically variable transmission incorporating another family member of the present invention; and FIG. 8b is an operating mode table and fixed ratio mode table depicting some of the operating characteristics of the powertrain shown in FIG. 8a.

DESCRIPTION OF THE PREFERRED EMBODIMENTS

Figures 1A, 1B:
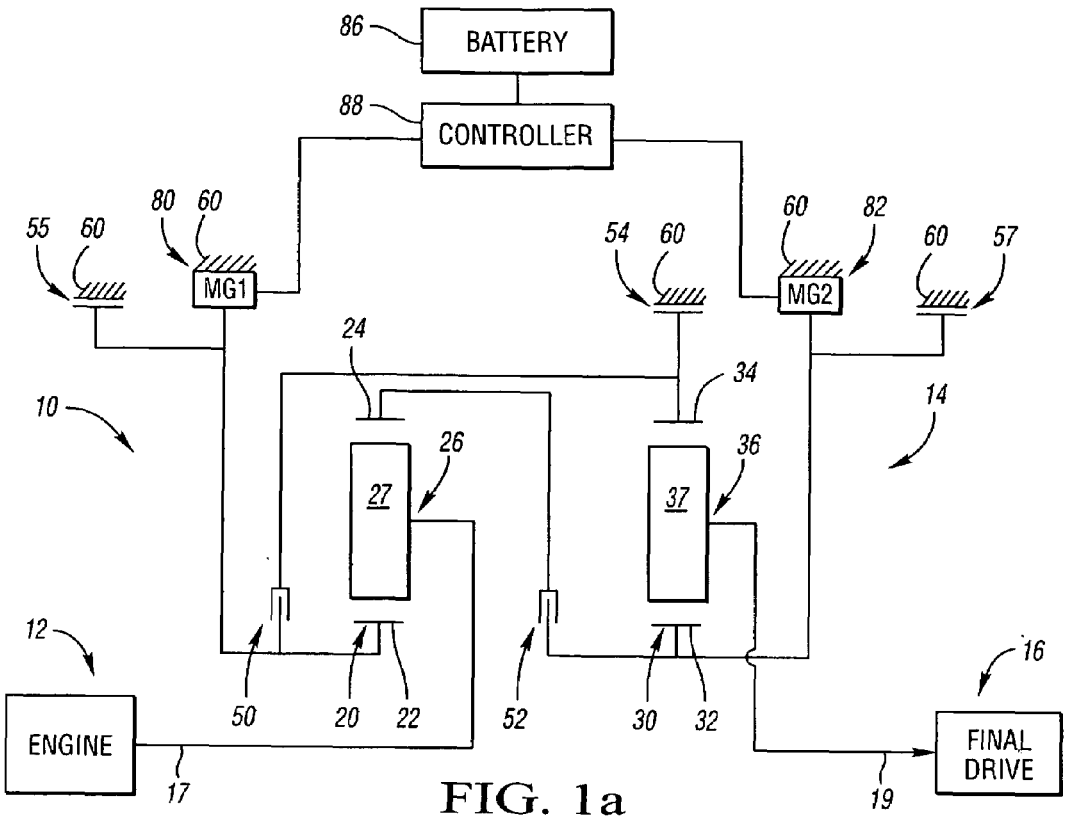

With reference to FIG. 1a, a powertrain 10 is shown, including an engine 12 connected to one preferred embodiment of the improved electrically variable transmission (EVT), designated generally by the numeral 14. Transmission 14 is designed to receive at least a portion of its driving power from the engine 12. As shown, the engine 12 has an output shaft that serves as the input member 17 of the transmission 14. A transient torque damper (not shown) may also be implemented between the engine 12 and the input member 17 of the transmission.

In the embodiment depicted the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 17, the transmission input member 17 is operatively connected to a planetary gear set in the transmission 14.

An output member 19 of the transmission 14 is connected to a final drive 16.

The transmission 14 utilizes two differential gear sets, preferably in the nature of planetary gear sets 20 and 30. The planetary gear set 20 employs an outer gear member 24, typically designated as the ring gear. The ring gear member 24 circumscribes an inner gear member 22, typically designated as the sun gear. A carrier member 26 rotatably supports a plurality of planet gears 27 such that each planet gear 27 meshingly engages both the outer, ring gear member 24 and the inner, sun gear member 22 of the first planetary gear set 20.

The planetary gear set 30 also has an outer gear member 34, often also designated as the ring gear that circumscribes an inner gear member 32, also often designated as the sun gear member. A plurality of planet gears 37 are also rotatably mounted in a carrier member 36 such that each planet gear member 37 simultaneously, and meshingly, engages both the outer, ring gear member 34 and the inner, sun gear member 32 of the planetary gear set 30.

The first preferred embodiment 10 also incorporates first and second motor/generators 80 and 82, respectively. The stator of the first motor/generator 80 is secured to the transmission housing 60. The rotor of the first motor/generator 80 is secured to the sun gear member 22 of the planetary gear set 20.

The stator of the second motor/generator 82 is also secured to the transmission housing 60. The rotor of the second motor/generator 82 is secured to the sun gear member 32 of the planetary gear set 30.

A first torque transfer device, such as a clutch 50, selectively connects the sun gear member 22 of the planetary gear set 20 to the ring gear member 34 of the planetary gear set 30. A second torque transfer device, such as clutch 52, selectively connects the ring gear member 24 of the planetary gear set 20 with the sun gear member 32 of the planetary gear set 30. A third torque transfer device, such as brake 54, selectively connects the ring gear member 34 of the planetary gear set 30 with the transmission housing 60. That is, the ring gear member 34 is selectively secured against rotation by an operative connection to the non-rotatable housing 60. A fourth torque transfer device, such as the brake 55, is connected in parallel with the motor/generator 80 for selectively braking rotation thereof. A fifth torque transfer device, such as the brake 57, is connected in parallel with the motor/generator 82 for selectively braking rotation thereof. The first, second, third, fourth and fifth torque transfer devices 50, 52, 54, 55 and 57 are employed to assist in the selection of the operational modes of the hybrid transmission 14, as will be hereinafter more fully explained.

The transmission input member 17 is connected with the carrier member 26 of the planetary gear set 20. The output drive member 19 of the transmission 14 is secured to the carrier member 36 of the planetary gear set 30.

Returning now to the description of the power sources, it should be apparent from the foregoing description, and with particular reference to FIG. 1a, that the transmission 14 selectively receives power from the engine 12. The hybrid transmission also receives power from an electric power source 86, which is operably connected to a controller 88.

The electric power source 86 may be one or more batteries. Other electric power sources, such as fuel cells, that have the ability to provide, or store, and dispense electric power may be used in place of batteries without altering the concepts of the present invention.

General Operating Considerations

One of the primary control devices is a well known drive range selector (not shown) that directs an electronic control unit (the ECU 88) to configure the transmission for either the park, reverse, neutral, or forward drive range. The second and third primary control devices constitute an accelerator pedal (not shown) and a brake pedal (also not shown). The information obtained by the ECU from these three primary control sources is designated as the "operator demand." The ECU also obtains information from a plurality of sensors (input as well as output) as to the status of: the torque transfer devices (either applied or released); the engine output torque; the unified battery, or batteries, capacity level; and, the temperatures of selected vehicular components. The ECU determines what is required and then manipulates the selectively operated components of, or associated with, the transmission appropriately to respond to the operator demand.

The invention may use simple or compound planetary gear sets. In a simple planetary gear set a single set of planet gears are normally supported for rotation on a carrier that is itself rotatable.

In a simple planetary gear set, when the sun gear is held stationary and power is applied to the ring gear of a simple planetary gear set, the planet gears rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier is restrained from spinning freely, and power is applied to either the sun gear or the ring gear, the planet gear members act as idlers. In that way the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

In a simple set of planetary gears, if any two rotational speeds of the sun gear, the planet carrier, and the ring gear are known, then the speed of the third member can be determined using a simple rule. The rotational speed of the carrier is always proportional to the speeds of the sun and the ring, weighted by their respective numbers of teeth. For example, a ring gear may have twice as many teeth as the sun gear in the same set. The speed of the carrier is then the sum of two-thirds the speed of the ring gear and one-third the speed of the sun gear. If one of these three members rotates in an opposite direction, the arithmetic sign is negative for the speed of that member in mathematical calculations.

The torque on the sun gear, the carrier, and the ring gear can also be simply related to one another if this is done without consideration of the masses of the gears, the acceleration of the gears, or friction within the gear set, all of which have a relatively minor influence in a well designed transmission. The torque applied to the sun gear of a simple planetary gear set must balance the torque applied to the ring gear, in proportion to the number of teeth on each of these gears. For example, the torque applied to a ring gear with twice as many teeth as the sun gear in that set must be twice that applied to the sun gear, and must be applied in the same direction. The torque applied to the carrier must be equal in magnitude and opposite in direction to the sum of the torque on the sun gear and the torque on the ring gear.

In a compound planetary gear set, the utilization of inner and outer sets of planet gears effects an exchange in the roles of the ring gear and the planet carrier in comparison to a simple planetary gear set. For instance, if the sun gear is held stationary, the planet carrier will rotate in the same direction as the ring gear, but the planet carrier with inner and outer sets of planet gears will travel faster than the ring gear, rather than slower.

In a compound planetary gear set having meshing inner and outer sets of planet gears the speed of the ring gear is proportional to the speeds of the sun gear and the planet carrier, weighted by the number of teeth on the sun gear and the number of teeth filled by the planet gears, respectively. For example, the difference between the ring and the sun filled by the planet gears might be as many teeth as are on the sun gear in the same set. In that situation the speed of the ring gear would be the sum of two-thirds the speed of the carrier and one third the speed of the sun. If the sun gear or the planet carrier rotates in an opposite direction, the arithmetic sign is negative for that speed in mathematical calculations.

If the sun gear were to be held stationary, then a carrier with inner and outer sets of planet gears will turn in the same direction as the rotating ring gear of that set. On the other hand, if the sun gear were to be held stationary and the carrier were to be driven, then planet gears in the inner set that engage the sun gear roll, or "walk," along the sun gear, turning in the same direction that the carrier is rotating. Pinion gears in the outer set that mesh with pinion gears in the inner set will turn in the opposite direction, thus forcing a meshing ring gear in the opposite direction, but only with respect to the planet gears with which the ring gear is meshingly engaged. The planet gears in the outer set are being carried along in the direction of the carrier. The effect of the rotation of the pinion gears in the outer set on their own axis and the greater effect of the orbital motion of the planet gears in the outer set due to the motion of the carrier are combined, so the ring rotates in the same direction as the carrier, but not as fast as the carrier.

If the carrier in such a compound planetary gear set were to be held stationary and the sun gear were to be rotated, then the ring gear will rotate with less speed and in the same direction as the sun gear. If the ring gear of a simple planetary gear set is held stationary and the sun gear is rotated, then the carrier supporting a single set of planet gears will rotate with less speed and in the same direction as the sun gear. Thus, one can readily observe the exchange in roles between the carrier and the ring gear that is caused by the use of inner and outer sets of planet gears which mesh with one another, in comparison with the usage of a single set of planet gears in a simple planetary gear set.

The normal action of an electrically variable transmission is to transmit mechanical power from the input to the output. As part of this transmission action, one of its two motor/generators acts as a generator of electrical power. The other motor/generator acts as a motor and uses that electrical power. As the speed of the output increases from zero to a high speed, the two motor/generators 80, 82 gradually exchange roles as generator and motor, and may do so more than once. These exchanges take place around mechanical points, where essentially all of the power from input to output is transmitted mechanically and no substantial power is transmitted electrically.

In a hybrid electrically variable transmission system, the battery 86 may also supply power to the transmission or the transmission may supply power to the battery. If the battery is supplying substantial electric power to the transmission, such as for vehicle acceleration, then both motor/generators may act as motors. If the transmission is supplying electric power to the battery, such as for regenerative braking, both motor/generators may act as generators. Very near the mechanical points of operation, both motor/generators may also act as generators with small electrical power outputs, because of the electrical losses in the system.

Contrary to the normal action of the transmission, the transmission may actually be used to transmit mechanical power from the output to the input. This may be done in a vehicle to supplement the vehicle brakes and to enhance or to supplement regenerative braking of the vehicle, especially on long downward grades. If the power flow through the transmission is reversed in this way, the roles of the motor/generators will then be reversed from those in normal action.

Specific Operating Considerations

Each of the embodiments described herein has fourteen or fifteen functional requirements (corresponding with the 14 or 15 rows of each operating mode table shown in the Figures) which may be grouped into five operating modes. These five operating modes are described below and may be best understood by referring to the respective operating mode table accompanying each transmission stick diagram, such as the operating mode tables of FIGS. 1b, 2b, 3b, etc.

The first operating mode is the "battery reverse mode" which corresponds with the first row (Batt Rev) of each operating mode table, such as that of FIG. 1b. In this mode, the engine is off and the transmission element connected to the engine is not controlled by engine torque, though there may be some residual torque due to the rotational inertia of the engine. The EVT is driven by one of the motor/generators using energy from the battery, causing the vehicle to move in reverse. Depending on the kinematic configuration, the other/motor/generator may or may not rotate in this mode, and may or may not transmit torque. If it does rotate, it is used to generate energy which is stored in the battery. In the embodiment of FIG. 1b, in the battery reverse mode, the brake 54 is engaged, the generator 80 has zero torque, the motor 82 has a torque of −1.00 units, and a torque ratio of −2.88 is achieved, corresponding to an engine input torque of 1 unit, by way of example. In each operating mode table an (M) next to a torque value in the motor/generator columns 80 and 82 indicates that the motor/generator is acting as a motor, and the absence of an (M) indicates that the motor/generator is acting as generator.

The second operating mode is the "EVT reverse mode" (or mechanical reverse mode) which corresponds with the second row (EVT Rev) of each operating mode table, such as that of FIG. 1b. In this mode, the EVT is driven by the engine and by one of the motor/generators. The other motor/generator operates in generator mode and transfers 100% of the generated energy back to the driving motor. The net effect is to drive the vehicle in reverse. Referring to FIG. 1b, for example, in the EVT reverse mode, the clutch 52 and brake 54 are engaged, the generator 80 has a torque of −0.35 units, the motor 82 has a torque of −3.55 units, and an output torque of −8.33 is achieved, corresponding to an engine torque of 1 unit.

The third operating mode includes the "reverse and forward launch modes" (also referred to as "torque converter reverse and forward modes") corresponding with the third and fourth rows (TC Rev and TC For) of each operating mode table, such as that of FIG. 1b. In this mode, the EVT is driven by the engine and one of the motor/generators. A selectable fraction of the energy generated in the generator unit is stored in the battery, with the remaining energy being transferred to the motor. In FIG. 1, this fraction is approximately 99%. The ratio of transmission output speed to engine speed (transmission speed ratio) is approximately +/−0.001 (the positive sign indicates that the vehicle is creeping forward and negative sign indicates that the vehicle is creeping backwards). Referring to FIG. 1b, in the reverse and forward launch modes, the clutch 52 and brake 54 are engaged. In the TC Reverse mode, the motor/generator 80 acts as a generator with −0.35 units of torque, the motor/generator 82 acts as a motor with −3.09 units of torque, and a torque ratio of −7.00 is achieved. In the TC Forward mode, the motor/generator 80 acts as a generator with −0.35 units of torque, the motor/generator 82 acts as a motor with 0.98 units of torque, and a torque ratio of 4.69 is achieved.

The fourth operating mode is a "continuously variable transmission range mode" which includes the Range 1.1, Range 1.2, Range 1.3, Range 1.4, Range 2.1, Range 2.2, Range 2.3 and Range 2.4 operating points corresponding with rows 5-12 of each operating point table, such as that of FIG. 1b. In this mode, the EVT is driven by the engine as well as one of the motor/generators operating as a motor. The other motor/generator operates as a generator and transfers 100% of the generated energy back to the motor. The operating points represented by Range 1.1, 1.2, . . . , etc. are discrete points in the continuum of forward speed ratios provided by the EVT. For example in FIG. 1b, a range of torque ratios from 4.69 to 1.86 is achieved with the clutch 52 and brake 54 engaged, and a range of ratios 1.36 to 0.54 is achieved with the clutches 50 and 52 engaged.

The fifth operating mode includes the "fixed ratio" modes (F1 and F2) corresponding with rows 13-14 of each operating mode table (i.e. operating mode table), such as that of FIG. 1b. In this mode the transmission operates like a conventional automatic transmission, with three torque transfer devices engaged to create a discrete transmission ratio. The clutching table accompanying each figure shows only 2 fixed-ratio forward speeds but additional fixed ratios may be available. Referring to FIG. 1b, in fixed ratio F1 the clutch 52 and brakes 54, 55 are engaged to achieve a fixed torque ratio of 1.88. Accordingly, each "X" in the column of motor/generators 80, 82 in FIG. 1b indicates that the respective brake 55 or 57 is engaged and the motor/generators 80 or 82 is not rotating. In fixed ratio F2, the clutches 50, 52 and brake 57 are engaged to achieve a fixed ratio of 0.53.

The transmission 14 is capable of operating in so-called single or dual modes. In single mode, the engaged torque transfer device remains the same for the entire continuum of forward speed ratios (represented by the discrete points: Ranges 1.1, 1.2, 1.3 and 1.4). In dual mode, the engaged torque transfer device is switched at some intermediate speed ratio (e.g., Range 2.1 in FIG. 1). Depending on the mechanical configuration, this change in torque transfer device engagement has advantages in reducing element speeds in the transmission.

In some designs, it is possible to synchronize clutch element slip speeds such that shifts are achievable with minimal torque disturbance (so-called "cold" shifts). For example, the transmissions of FIGS. 1a, 2a, 3a, 4a and 5a have cold shifts between ranges 1.4 and 2.1. This also serves as an enabler for superior control during double transition shifts (two oncoming clutches and two off-going clutches).

As set forth above, the engagement schedule for the torque transfer devices is shown in the operating mode table and fixed ratio mode table of FIG. 1b. FIG. 1b also provides an example of torque ratios that are available utilizing the ring gear/sun gear tooth ratios given by way of example in FIG. 1b. The $N_{R1}/N_{S1}$ value is the tooth ratio of the planetary gear set 20; and the $N_{R2}/N_{S2}$ value is the tooth ratio of the planetary gear set 30. Also, the chart of FIG. 1b describes the ratio steps that are attained utilizing the sample of tooth ratios given. For example, the step ratio between first and second fixed forward torque ratios is 3.55.

Description of a Second Exemplary Embodiment

Figures 2A, 2B:
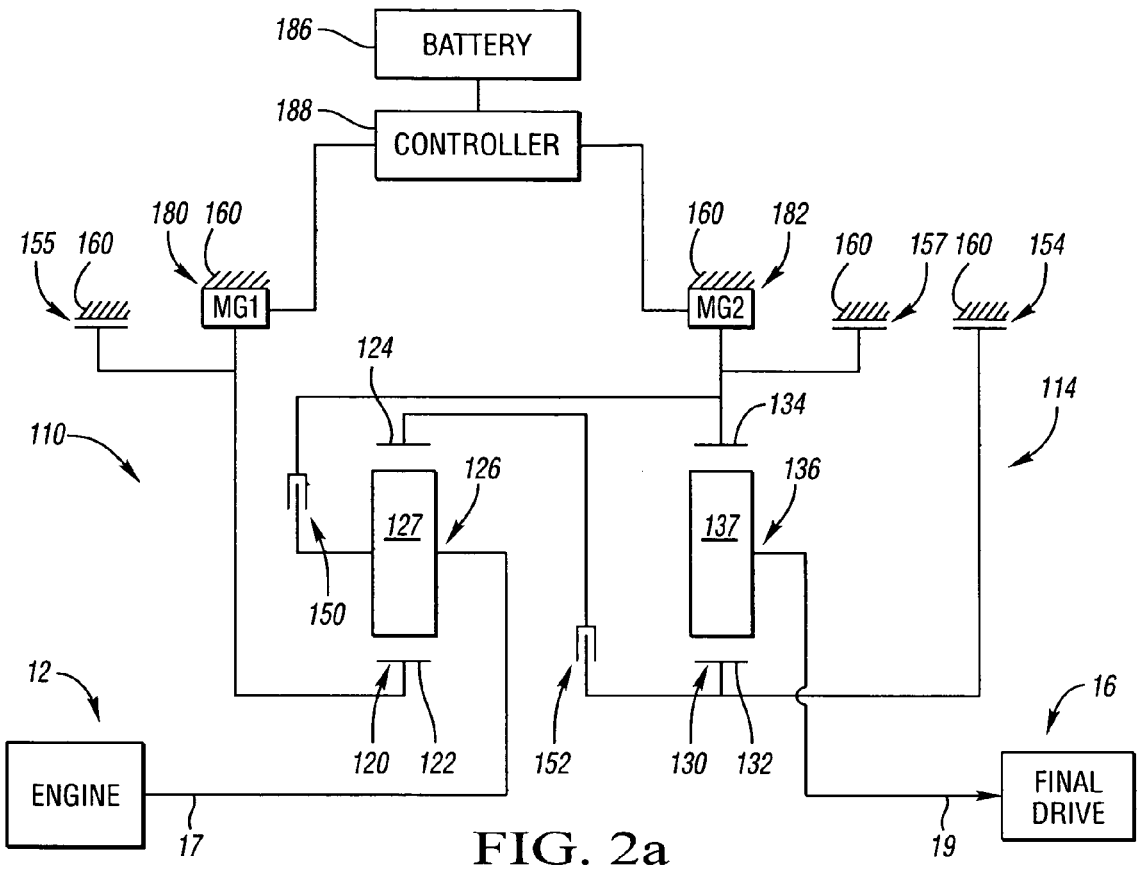

With reference to FIG. 2a, a powertrain 110 is shown, including an engine 12 connected to one preferred embodiment of the improved electrically variable transmission, designated generally by the numeral 114. Transmission 114 is designed to receive at least a portion of its driving power from the engine 12.

In the embodiment depicted the engine 12 may also be a fossil fuel engine, such as a diesel engine which is readily adapted to provide its available power output typically delivered at a constant number of revolutions per minute (RPM). As shown, the engine 12 has an output shaft that serves as the input member 17 of the transmission 114. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 114. An output member 19 of the transmission 114 is connected to a final drive 16.

The transmission 114 utilizes two differential gear sets, preferably in the nature of planetary gear sets 120 and 130. The planetary gear set 120 employs an outer gear member 124, typically designated as the ring gear. The ring gear member 124 circumscribes an inner gear member 122, typically designated as the sun gear. A carrier member 126 rotatably supports a plurality of planet gears 127 such that each planet gear 127 meshingly engages both the outer, ring gear member 124 and the inner, sun gear member 122 of the first planetary gear set 120.

The planetary gear set 130 also has an outer gear member 134, often also designated as the ring gear, that circumscribes an inner gear member 132, also often designated as the sun gear. A plurality of planet gears 137 are also rotatably mounted in a carrier member 136 such that each planet gear member 137 simultaneously, and meshingly, engages both the outer, ring gear member 134 and the inner, sun gear member 132 of the planetary gear set 130.

The transmission input member 17 is connected with the carrier member 126 of the planetary gear set 120, and the transmission output member 19 is connected with the carrier member 136 of the planetary gear set 130.

The transmission 114 also incorporates first and second motor/generators 180 and 182, respectively. The stator of the first motor/generator 180 is secured to the transmission housing 160. The rotor of the first motor/generator 180 is secured to the sun gear member 122 of the planetary gear set 120.

The stator of the second motor/generator 182 is also secured to the transmission housing 160. The rotor of the second motor/generator 182 is secured to the ring gear member 134 of the planetary gear set 130.

A first torque transfer device, such as a clutch 150, selectively connects the carrier member 126 of the planetary gear set 120 to the ring gear member 134 of the planetary gear set 130. A second torque transfer device, such as clutch 152, selectively connects the ring gear member 124 of the planetary gear set 120 with the sun gear member 132 of the planetary gear set 130. A third torque transfer device, such as brake 154, selectively connects the sun gear member 132 of the planetary gear set 130 with the transmission housing 160. That is, the sun gear member 132 is selectively secured against rotation by an operative connection to the non-rotatable housing 160. A fourth torque transfer device, such as the brake 155, is connected in parallel with the motor/generator 180 for selectively braking rotation thereof. A fifth torque transfer device, such as the brake 157, is connected in parallel with the motor/generator 182 for selectively braking rotation thereof. The first, second, third, fourth and fifth torque transfer devices 150, 152, 154, 155 and 157 are employed to assist in the selection of the operational modes of the hybrid transmission 114.

Returning now to the description of the power sources, it should be apparent from the foregoing description, and with particular reference to FIG. 2a, that the transmission 114 selectively receives power from the engine 12. The hybrid transmission also exchanges power with an electric power source 186, which is operably connected to a controller 188. The electric power source 186 may be one or more batteries. Other electric power sources, such as fuel cells, that have the ability to provide, or store, and dispense electric power may be used in place of batteries without altering the concepts of the present invention.

As described previously, each embodiment has fourteen or fifteen functional requirements (corresponding with the 14 or 15 rows of each operating mode table shown in the Figures) which may be grouped into five operating modes. The first operating mode is the "battery reverse mode" which corresponds with the first row (Batt Rev) of the operating mode table of FIG. 2b. In this mode, the engine is off and the transmission element connected to the engine is effectively allowed to freewheel, subject to engine inertia torque. The EVT is driven by one of the motor/generators using energy from the battery, causing the vehicle to move in reverse. The other motor/generator may or may not rotate in this mode. As shown in FIG. 2b, in this mode the brake 154 is engaged, the motor/generator 180 has zero torque, the motor 182 has a torque of −1.00 unit and an output torque of −1.50 is achieved, by way of example.

The second operating mode is the "EVT reverse mode" (or mechanical reverse mode) which corresponds with the second row (EVT Rev) of the operating mode table of FIG. 2b. In this mode, the EVT is driven by the engine and by one of the motor/generators. The other motor/generator operates in generator mode and transfers 100% of the generated energy back to the driving motor. The net effect is to drive the vehicle in reverse. In this mode, the clutch 152 and brake 154 are engaged, the generator 180 has a torque of −0.25 units, the motor 182 has a torque of −5.55 units, and an output torque of −8.33 is achieved, corresponding to an input torque of 1 unit.

The third operating mode includes the "reverse and forward launch modes" corresponding with the third and fourth rows (TC Rev and TC For) of each operating mode table, such as that of FIG. 2b. In this mode, the EVT is driven by the engine and one of the motor/generators. A selectable fraction of the energy generated in the generator unit is stored in the battery, with the remaining energy being transferred to the motor. In this mode, the clutch 152 and the brake 154 are engaged, and the motor/generator 180 acts as a generator (with −0.25 units of torque in reverse and forward), the motor/generator 182 acts as a motor in TC Reverse with −4.67 units of torque, and as a motor in TC Forward with 3.13 units of, and a torque ratio of −7.00 (TC reverse) or 4.69 (TC forward) is achieved. For these torque ratios, approximately 99% of the generator energy is stored in the battery.

The fourth operating mode includes the "Range 1.1, Range 1.2, Range 1.3, Range 1.4, Range 2.1, Range 2.2, Range 2.3 and Range 2.4" modes corresponding with rows 5-12 of the operating mode table of FIG. 2b. In this mode, the EVT is driven by the engine as well as one of the motor/generators operating as a motor. The other motor/generator operates as a generator and transfers 100% of the generated energy back to the motor. The operating points represented by Range 1.1, 1.2, . . . , etc. are discrete points in the continuum of forward speed ratios provided by the EVT. For example in FIG. 2b, a range of ratios from 4.69 to 1.86 is achieved with the clutch 152 and the brake 154 engaged, and a range of ratios from 1.36 to 0.54 is achieved with the clutches 150 and 152 engaged.

The fifth operating mode includes the fixed "ratio" modes (F1, F2 and F3) corresponding with rows 13-15 of the operating mode table of FIG. 2b. In this mode the transmission operates like a conventional automatic transmission, with three torque transfer devices engaged to create a discrete transmission ratio. In fixed ratio F1 the clutch 152 and brakes 154 and 155 are engaged to achieve a fixed ratio of 2.24. In fixed ratio F2, the clutch 150 and brakes 155 and 157 are engaged to achieve a fixed ratio of 1.50. In fixed ratio F3, the clutches 150, 152 and brake 155 are engaged to achieve a fixed ratio of 0.90.

As set forth above, the engagement schedule for the torque transfer devices is shown in the operating mode table and fixed ratio mode table of FIG. 2b. FIG. 2b also provides an example of torque ratios that are available utilizing the ring gear/sun gear tooth ratios given by way of example in FIG. 2b. The $N_{R1}/N_{S1}$ value is the tooth ratio of the planetary gear set 120; and the $N_{R2}/N_{S2}$ value is the tooth ratio of the planetary gear set 130. Also, the chart of FIG. 2b describes the ratio steps that are attained utilizing the sample of tooth ratios given. For example, the step ratio between first and second fixed forward torque ratios is 1.49, the step ratio between the second and third fixed forward torque ratios is 1.67.

Description of a Third Exemplary Embodiment

Figures 3A, 3B:
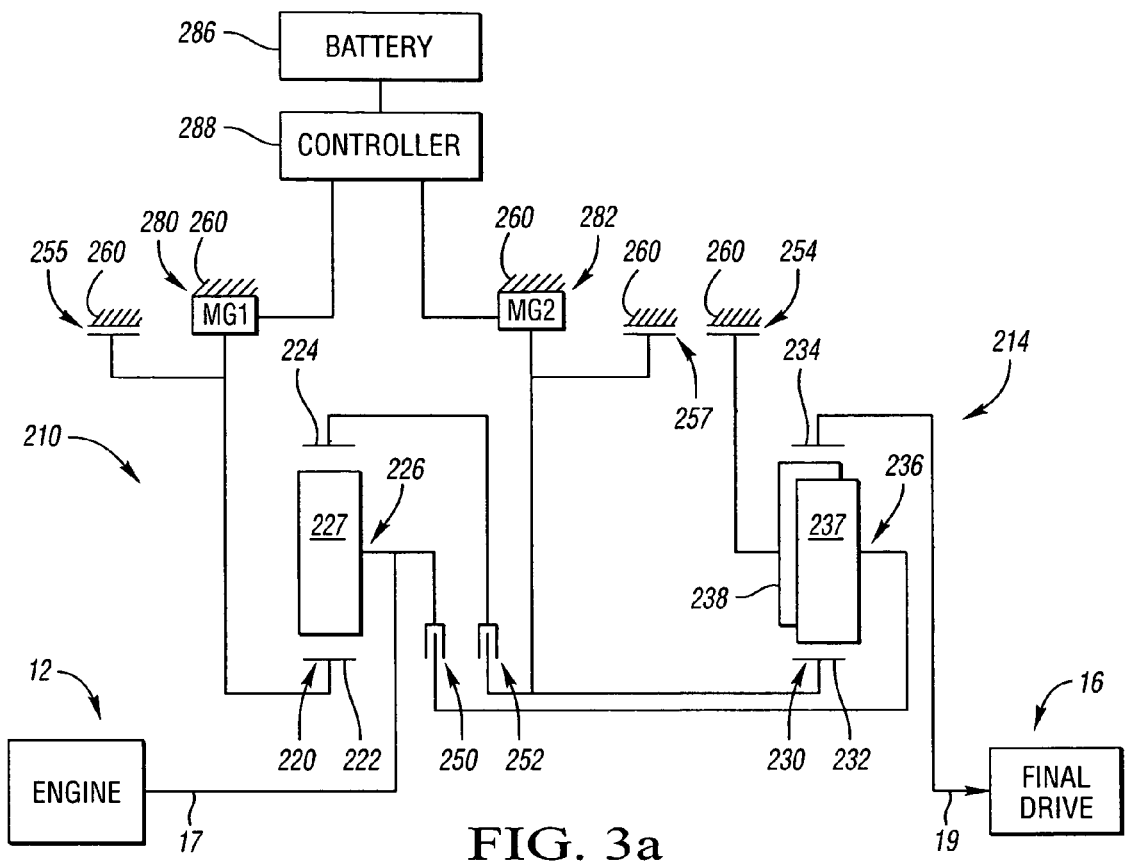

With reference to FIG. 3a, a powertrain 210 is shown, including an engine 12 connected to one preferred embodiment of the improved electrically variable transmission, designated generally by the numeral 214. The transmission 214 is designed to receive at least a portion of its driving power from the engine 12. As shown, the engine 12 has an output shaft that serves as the input member 17 of the transmission 214. A transient torque damper (not shown) may also be implemented between the engine 12 and the input member 17 of the transmission 214.

Irrespective of the means by which the engine 12 is connected to the transmission input member 17, the transmission input member is operatively connected to a planetary gear set in the transmission 214. An output member 19 of the transmission 214 is connected to a final drive 16.

The transmission 214 utilizes two differential gear sets, preferably in the nature of planetary gear sets 220 and 230. The planetary gear set 220 employs an outer gear member 224, typically designated as the ring gear. The ring gear member 224 circumscribes an inner gear member 222, typically designated as the sun gear. A carrier member 226 rotatably supports a plurality of planet gears 227 such that each planet gear 227 meshingly engages both the outer, ring gear member 224 and the inner, sun gear member 222 of the first planetary gear set 220.

The planetary gear set 230 also has an outer ring gear member 234 that circumscribes an inner sun gear member 232. A plurality of planet gears 237, 238 are also rotatably mounted in a carrier member 236 such that each planet gear member 237 meshingly engages the sun gear member 232, and each planet gear 238 meshingly engages the ring gear member 234, while the planet gears 237 and 238 meshingly engage each other.

The transmission input member 17 is connected with the carrier member 226, and the transmission output member 19 is connected to the ring gear member 234.

The transmission 214 also incorporates first and second motor/generators 280 and 282, respectively. The stator of the first motor/generator 280 is secured to the transmission housing 260. The rotor of the first motor/generator 280 is secured to the sun gear member 222 of the planetary gear set 220.

The stator of the second motor/generator 282 is also secured to the transmission housing 260. The rotor of the second motor/generator 282 is secured to the sun gear member 232 of the planetary gear set 230.

A first torque-transfer device, such as clutch 250, selectively connects the carrier member 226 of the planetary gear set 220 with the carrier member 236 of the planetary gear set 230. A second torque-transfer device, such as clutch 252, selectively connects the ring gear member 224 of the planetary gear set 220 with the sun gear member 232 of the planetary gear set 230. A third torque-transfer device, such as a brake 254, selectively connects the carrier member 236 with the transmission housing 260. A fourth torque transfer device, such as the brake 255, is connected in parallel with the motor/generator 280 for selectively braking rotation thereof. A fifth torque transfer device, such as the brake 257, is connected in parallel with the motor/generator 282 for selectively braking rotation thereof. The first, second, third, fourth and fifth torque-transfer devices 250, 252, 254, 255 and 257 are employed to assist in the selection of the operational modes of the hybrid transmission 214.

The hybrid transmission 214 receives power from the engine 12, and also from electric power source 286, which is operably connected to a controller 288.

The operating mode table of FIG. 3b illustrates the clutching engagements, motor/generator conditions and output/input ratios for the five operating modes of the transmission 214. These modes include the "battery reverse mode" (Batt Rev), "EVT reverse mode" (EVT Rev), "reverse and forward launch modes" (TC Rev and TC For), "range 1.1, 1.2, 1.3 ... modes" and "fixed ratio modes" (F1, F2 and F3) as described previously.

As set forth above the engagement schedule for the torque-transfer devices is shown in the operating mode table and fixed ratio mode table of FIG. 3b. FIG. 3b also provides an example of torque ratios that are available utilizing the ring gear/sun gear tooth ratios given by way of example in FIG. 3b. The $N_{R1}/N_{S1}$ value is the tooth ratio of the planetary gear set 220; and the $N_{R2}/N_{S2}$ value is the tooth ratio of the planetary gear set 230. Also, the chart of FIG. 3b describes the ratio steps that are attained utilizing the sample of tooth ratios given. For example, the step ratio between the first and second fixed forward torque ratios is 1.49, the step ratio between the second and third fixed forward torque ratios 1.67.

Description of a Fourth Exemplary Embodiment

Figures 4A, 4B:
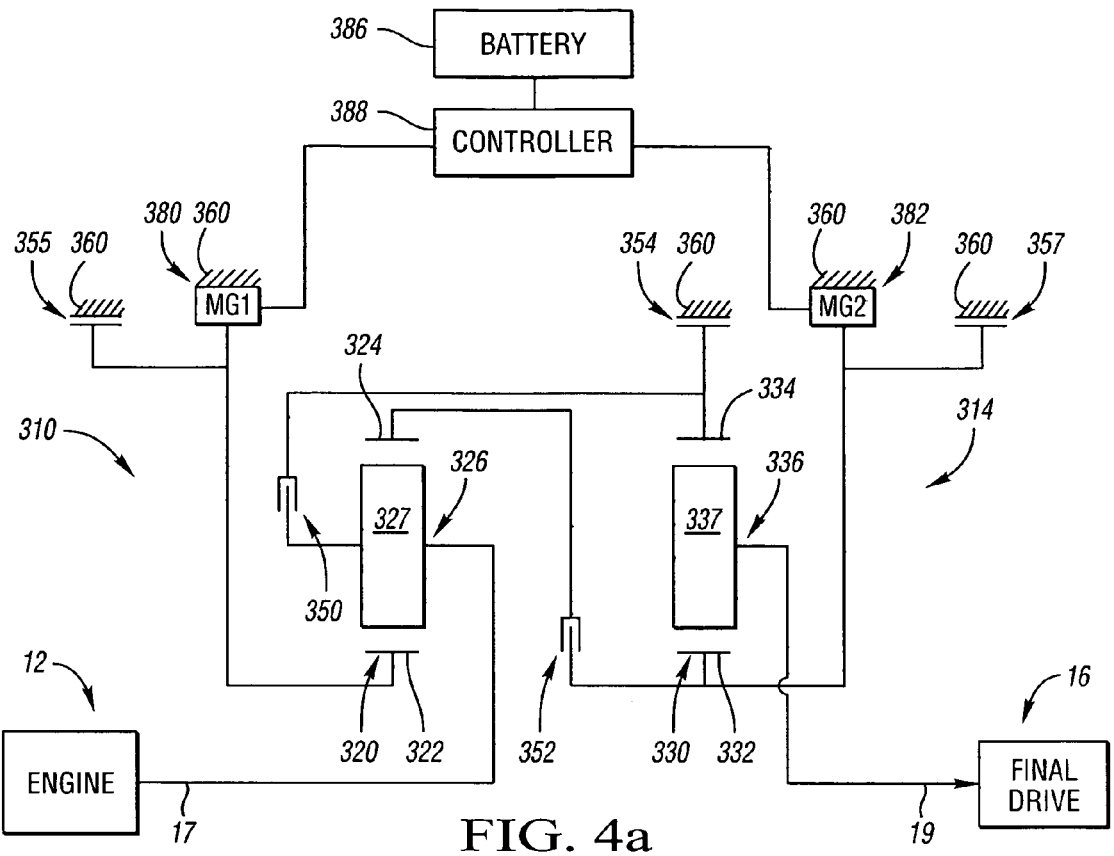

With reference to FIG. 4a, a powertrain 310 is shown, including an engine 12 connected to one preferred embodiment of the improved electrically variable transmission, designated generally by the numeral 314. The transmission 314 is designed to receive at least a portion of its driving power from the engine 12.

As shown, the engine 12 has an output shaft that serves as the input member 17 of the transmission 314. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 314. An output member 19 of the transmission 314 is connected to a final drive 16.

The transmission 314 utilizes two planetary gear sets 320 and 330. The planetary gear set 320 employs an outer ring gear member 324 which circumscribes an inner sun gear member 322. A carrier member 326 rotatably supports a plurality of planet gears 327 such that each planet gear 327 meshingly engages both the outer ring gear member 324 and the inner sun gear member 322 of the first planetary gear set 320.

The planetary gear set 330 also has an outer ring gear member 334 that circumscribes an inner sun gear member 332. A plurality of planet gears 337 are also rotatably mounted in a carrier member 336 such that each planet gear member 337 simultaneously, and meshingly engages both the outer, ring gear member 334 and the inner, sun gear member 332 of the planetary gear set 330.

The transmission input member 17 is connected with the carrier member 326 of the planetary gear set 320, and the transmission output member 19 is connected with the carrier member 336 of the planetary gear set 330.

The transmission 314 also incorporates first and second motor/generators 380 and 382, respectively. The stator of the first motor/generator 380 is secured to the transmission housing 360. The rotor of the first motor/generator 380 is secured to the sun gear member 322 of the planetary gear set 320. The stator of the second motor/generator 382 is also secured to the transmission housing 360. The rotor of the second motor/generator 382 is secured to the sun gear member 332 of the planetary gear set 330.

A first torque-transfer device, such as the clutch 350, selectively connects the carrier member 326 of the planetary gear set 320 with the ring gear member 334 of the planetary gear set 330. A second torque-transfer device, such as the clutch 352, selectively connects the ring gear member 324 with the sun gear member 332. A third torque-transfer device, such as brake 354, selectively connects the ring gear member 334 with the transmission housing 360. A fourth torque transfer device, such as the brake 355, is connected in parallel with the motor/generator 380 for selectively braking rotation thereof. A fifth torque transfer device, such as the brake 357, is connected in parallel with the motor/generator 382 for selectively braking rotation thereof. The first, second, third, fourth and fifth torque-transfer devices 350, 352, 354, 355 and 357 are employed to assist in the selection of the operational modes of the transmission 314.

The hybrid transmission 314 receives power from the engine 12, and also exchanges power with an electric power source 386, which is operably connected to a controller 388.

The operating mode table of FIG. 4b illustrates the clutching engagements, motor/generator conditions and output/input ratios for the five operating modes of the transmission 314. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 ... ) and "fixed ratio modes" (F1, F2, F3) as described previously.

As set forth above, the engagement schedule for the torque-transfer devices is shown in the operating mode table and fixed ratio mode table of FIG. 4b. FIG. 4b also provides an example of torque ratios that are available utilizing the ring gear/sun gear tooth ratios given by way of example in FIG. 4b. The $N_{R1}/N_{S1}$ value is the tooth ratio of the planetary gear set 320; and the $N_{R2}/N_{S2}$ value is the tooth ratio of the planetary gear set 330. Also, the chart of FIG. 4b describes the ratio steps that are attained utilizing the sample of tooth ratios given. For example, the step ratio between first and second fixed forward torque ratios is 1.86, and the step ratio between the second and third fixed forward torque ratios is 1.54.

Description of a Fifth Exemplary Embodiment

Figures 5A, 5B:
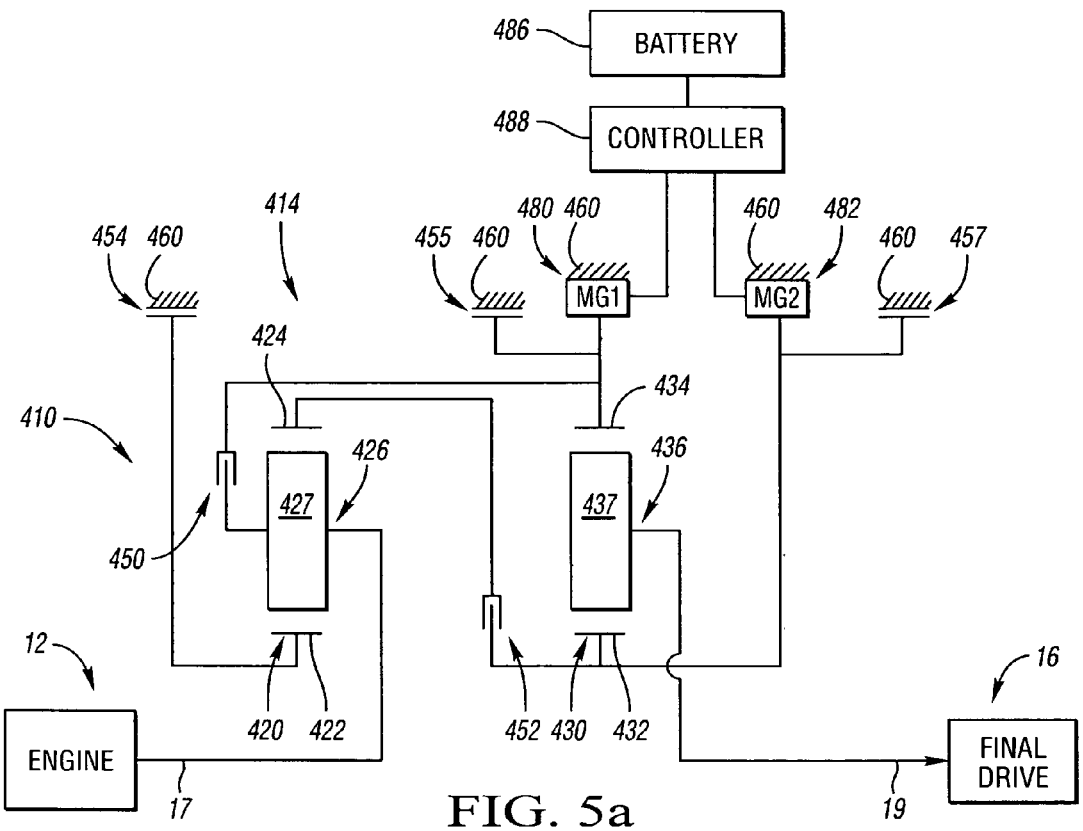

With reference to FIG. 5a, a powertrain 410 is shown, including an engine 12 connected to one preferred embodiment of the improved electrically variable transmission, designated generally by the numeral 414. The transmission 414 is designed to receive at least a portion of its driving power from the engine 12.

As shown, the engine 12 has an output shaft that serves as the input member 17 of the transmission 414. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 414. An output member 19 of the transmission 414 is connected to a final drive 16.

The transmission 414 utilizes two planetary gear sets 420 and 430. The planetary gear set 420 employs an outer ring gear member 424 which circumscribes an inner sun gear member 422. A carrier member 426 rotatably supports a plurality of planet gears 427 such that each planet gear 427 meshingly engages both the outer ring gear member 424 and the inner sun gear member 422 of the first planetary gear set 420.

The planetary gear set 430 also has an outer ring gear member 434 that circumscribes an inner sun gear member 432. A plurality of planet gears 437 are also rotatably mounted in a carrier member 436 such that each planet gear member 437 simultaneously, and meshingly engages both the outer, ring gear member 434 and the inner, sun gear member 432 of the planetary gear set 430.

The transmission input member 17 is continuously connected with the carrier member 426, and the transmission output member 19 is continuously connected with the carrier member 436.

The transmission 414 also incorporates first and second motor/generators 480 and 482, respectively. The stator of the first motor/generator 480 is secured to the transmission housing 460. The rotor of the first motor/generator 480 is secured to the ring gear member 434.

The stator of the second motor/generator 482 is also secured to the transmission housing 460. The rotor of the second motor/generator 482 is secured to the sun gear member 432.

A first torque-transfer device, such as a clutch 450, selectively connects the carrier member 426 with the ring gear member 434. A second torque-transfer device, such as clutch 452, selectively connects the ring gear member 424 with the sun gear member 432. A third torque-transfer device, such as brake 454, selectively connects the sun gear member 422 with the transmission housing 460. A fourth torque transfer device, such as the brake 455, is connected in parallel with the motor/generator 480 for selectively braking rotation thereof. A fifth torque transfer device, such as the brake 457, is connected in parallel with the motor/generator 482 for selectively braking rotation thereof. The first, second, third, fourth and fifth torque-transfer devices 450, 452, 454, 455 and 457 are employed to assist in the selection of the operational modes of the transmission 414. The hybrid transmission 414 receives power from the engine 12 and also from an electric power source 486, which is operably connected to a controller 488.

The operating mode table of FIG. 5b illustrates the clutching engagements, motor/generator conditions and output/input ratios for the five operating modes of the transmission 414. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3) as described previously.

As set forth above, the engagement schedule for the torque-transfer devices is shown in the operating mode table and fixed ratio mode table of FIG. 5b. FIG. 5b also provides an example of torque ratios that are available utilizing the ring gear/sun gear tooth ratios given by way of example in FIG. 5b. The $N_{R1}/N_{S1}$ value is the tooth ratio of the planetary gear set 420; and the $N_{R2}/N_{S2}$ value is the tooth ratio of the planetary gear set 430. Also, the chart of FIG. 5b describes the ratio steps that are attained utilizing the sample of tooth ratios given. For example, the step ratio between first and second fixed forward torque ratios is 1.86, and the step ratio between the second and third fixed forward torque ratios is 1.54.

Description of a Sixth Exemplary Embodiment

Figures 6A, 6B:
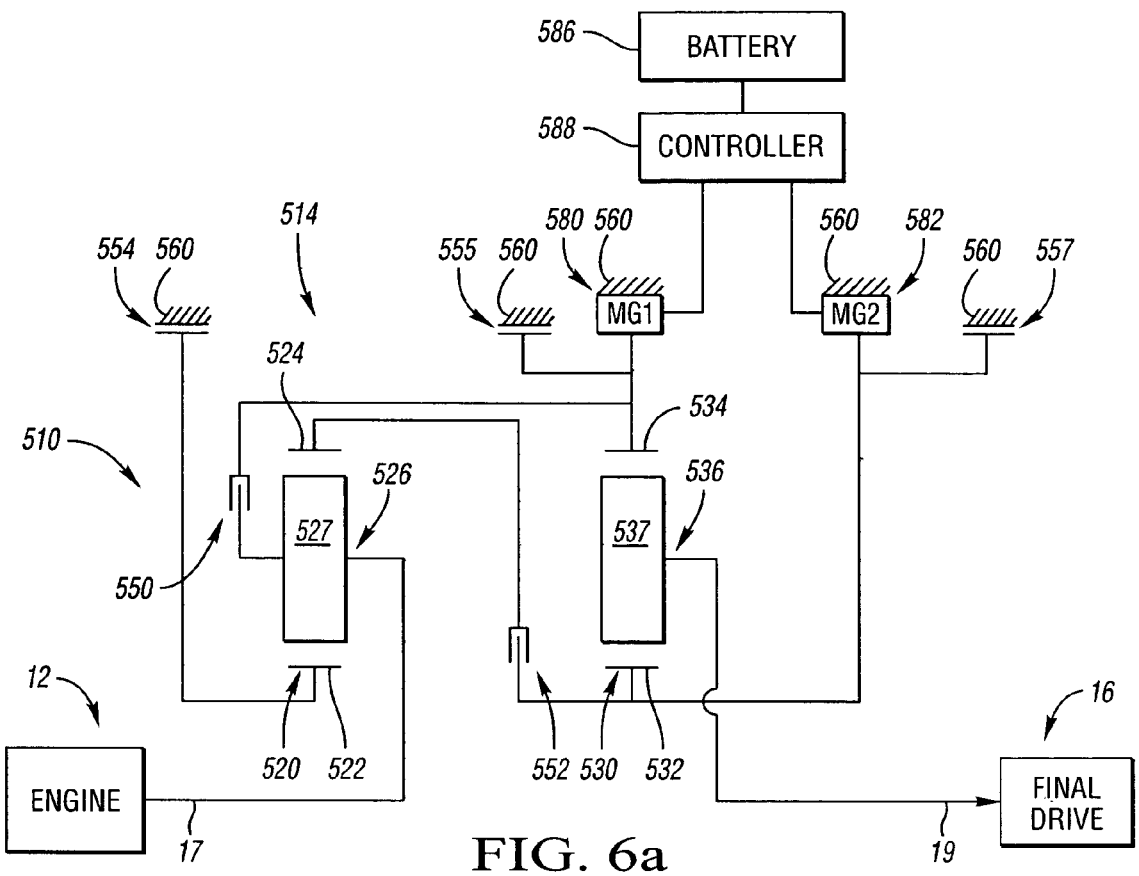

With reference to FIG. 6a, a powertrain 510 is shown, including an engine 12 connected to one preferred embodiment of the improved electrically variable transmission, designated generally by the numeral 514. The transmission 514 is designed to receive at least a portion of its driving power from the engine 12.

As shown, the engine 12 has an output shaft that serves as the input member 17 of the transmission 514. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 514. An output member 19 of the transmission 514 is connected to a final drive 16.

The transmission 514 utilizes two planetary gear sets 520 and 530. The planetary gear set 520 employs an outer ring gear member 524 which circumscribes an inner sun gear member 522. A carrier member 526 rotatably supports a plurality of planet gears 527 such that each planet gear 527 meshingly engages both the outer ring gear member 524 and the inner sun gear member 522 of the first planetary gear set 520.

The planetary gear set 530 also has an outer ring gear member 534 that circumscribes an inner sun gear member 532. A plurality of planet gears 537 are also rotatably mounted in a carrier member 536 such that each planet gear member 537 simultaneously, and meshingly engages both the outer, ring gear member 534 and the inner, sun gear member 532 of the planetary gear set 530.

The transmission input member 17 is continuously connected with the carrier member 526, and the transmission output member 19 is continuously connected with the carrier member 536.

The transmission 514 also incorporates first and second motor/generators 580 and 582, respectively. The stator of the first motor/generator 580 is secured to the transmission housing 560. The rotor of the first motor/generator 580 is secured to the ring gear member 534.

The stator of the second motor/generator 582 is also secured to the transmission housing 560. The rotor of the second motor/generator 582 is secured to the sun gear member 532.

A first torque-transfer device, such as a clutch 550, selectively connects the carrier member 526 with the ring gear member 534. A second torque-transfer device, such as a clutch 552, selectively connects the ring gear member 524 with the sun gear member 532. A third torque-transfer device, such as a brake 554, selectively connects the sun gear member 522 with the transmission housing 560. A fourth torque transfer device, such as the brake 555, is connected in parallel with the motor/generator 580 for selectively braking rotation thereof. A fifth torque transfer device, such as the brake 557, is connected in parallel with the motor/generator 582 for selectively braking rotation thereof. The first, second, third, fourth and fifth torque-transfer devices 550, 552, 554, 555 and 557 are employed to assist in the selection of the operational modes of the hybrid transmission 514.

The hybrid transmission 514 receives power from the engine 12, and also exchanges power with an electric power source 586, which is operably connected to a controller 588.

The operating mode table of FIG. 6b illustrates the clutching engagements, motor/generator conditions and output/input ratios for the five operating modes of the transmission 514. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3) as described previously.

As set forth above, the engagement schedule for the torque-transfer devices is shown in the operating mode table and fixed ratio mode table of FIG. 6b. FIG. 6b also provides an example of torque ratios that are available utilizing the ring gear/sun gear tooth ratios given by way of example in FIG. 6b. The $N_{R1}/N_{S1}$ value is the tooth ratio of the planetary gear set 520; and the $N_{R2}/N_{S2}$ value is the tooth ratio of the planetary gear set 530. Also, the chart of FIG. 4b describes the ratio steps that are attained utilizing the sample of tooth ratios given. For example, the step ratio between first and second fixed forward torque ratios is 1.86, and the step ratio between the second and third fixed forward torque ratios is 1.54.

Description of a Seventh Exemplary Embodiment

Figures 7A, 7B:
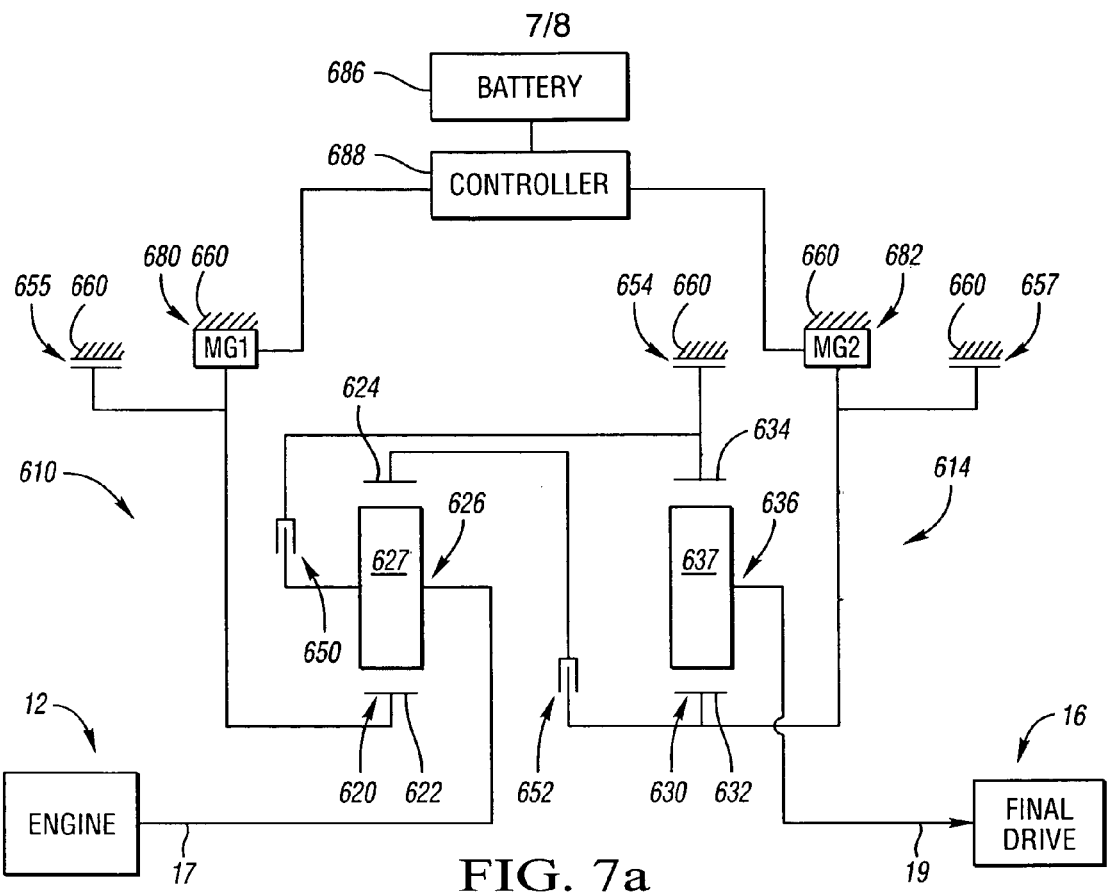

With reference to FIG. 7a, a powertrain 610 is shown, including an engine 12 connected to one preferred embodiment of the improved electrically variable transmission, designated generally by the numeral 614. The transmission 614 is designed to receive at least a portion of its driving power from the engine 12.

As shown, the engine 12 has an output shaft that serves as the input member 17 of the transmission 614. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 614. An output member 19 of the transmission 614 is connected to a final drive 16.

The transmission 614 utilizes two planetary gear sets 620 and 630. The planetary gear set 620 employs an outer ring gear member 624 which circumscribes an inner sun gear member 622. A carrier member 626 rotatably supports a plurality of planet gears 627 such that each planet gear 627 meshingly engages both the outer ring gear member 624 and the inner sun gear member 622 of the first planetary gear set 620.

The planetary gear set 630 also has an outer ring gear member 634 that circumscribes an inner sun gear member 632. A plurality of planet gears 637 are also rotatably mounted in a carrier member 636 such that each planet gear member 637 simultaneously, and meshingly engages both the outer, ring gear member 634 and the inner, sun gear member 632 of the planetary gear set 630.

The transmission input member 17 is connected with the carrier member 626 of the planetary gear set 620, and the transmission output member 19 is connected with the carrier member 636 of the planetary gear set 630.

The transmission 614 also incorporates first and second motor/generators 680 and 682, respectively. The stator of the first motor/generator 680 is secured to the transmission housing 660. The rotor of the first motor/generator 680 is secured to the sun gear member 622 of the planetary gear set 620. The stator of the second motor/generator 682 is also secured to the transmission housing 660. The rotor of the second motor/generator 682 is secured to the sun gear member 632 of the planetary gear set 630.

A first torque-transfer device, such as the clutch 650, selectively connects the carrier member 626 with the ring gear member 634. A second torque-transfer device, such as the clutch 652, selectively connects the ring gear member 624 with the sun gear member 632. A third torque-transfer device, such as brake 654, selectively connects the ring gear member 634 with the transmission housing 660. A fourth torque transfer device, such as the brake 655, is connected in parallel with the motor/generator 680 for selectively braking rotation thereof. A fifth torque transfer device, such as the brake 657, is connected in parallel with the motor/generator 682 for selectively braking rotation thereof. The first, second, third, fourth and fifth torque-transfer devices 650, 652, 654, 655 and 657 are employed to assist in the selection of the operational modes of the transmission 614.

The hybrid transmission 614 receives power from the engine 12, and also exchanges power with an electric power source 686, which is operably connected to a controller 688.

The operating mode table of FIG. 7b illustrates the clutching engagements, motor/generator conditions and output/input ratios for the five operating modes of the transmission 614. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3) as described previously.

As set forth above, the engagement schedule for the torque-transfer devices is shown in the operating mode table and fixed ratio mode table of FIG. 7b. FIG. 7b also provides an example of torque ratios that are available utilizing the ring gear/sun gear tooth ratios given by way of example in FIG. 7b. The $N_{R1}/N_{S1}$ value is the tooth ratio of the planetary gear set 620; and the $N_{R2}/N_{S2}$ value is the tooth ratio of the planetary gear set 630. Also, the chart of FIG. 7b describes the ratio steps that are attained utilizing the sample of tooth ratios given. For example, the step ratio between first and second fixed forward torque ratios is 1.86, and the step ratio between the second and third fixed forward torque ratios is 1.54.

Description of an Eighth Exemplary Embodiment

Figures 8A, 8B:
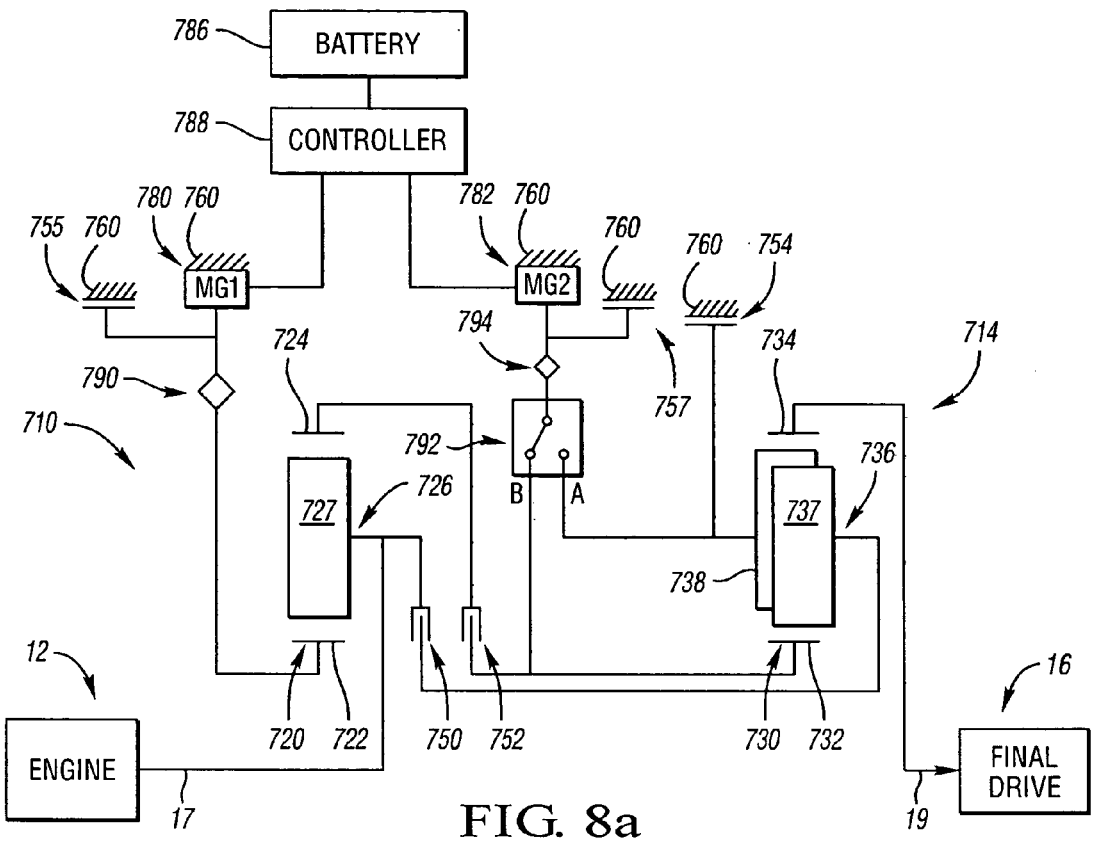

With reference to FIG. 8a, a powertrain 710 is shown, including an engine 12 connected to the improved electrically variable transmission (EVT), designated generally by the numeral 714. Transmission 714 is designed to receive at least a portion of its driving power from the engine 12. As shown, the engine 12 has an output shaft that serves as the input member 17 of the transmission 714. A transient torque damper (not shown) may also be implemented between the engine 12 and the input member 17 of the transmission.

In the embodiment depicted the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 17, the transmission input member 17 is operatively connectable to planetary gear members in the transmission 714.

An output member 19 of the transmission 714 is connected to a final drive 16.

The transmission 714 utilizes two differential gear sets, preferably in the nature of planetary gear sets 720 and 730. The planetary gear set 720 employs an outer gear member 724, typically designated as the ring gear. The ring gear 724 circumscribes an inner gear member 722, typically designated as the sun gear. A carrier member 726 rotatably supports a plurality of planet gears 727 such that each planet gear 727 meshingly engages both the inner, sun gear member 722, and the ring gear member 724.

The planetary gear set 730 also has an outer gear member 734, often also designated as the ring gear, that circumscribes an inner gear member 732, also often designated as the sun gear. A plurality of planet gears 737, 738 are also rotatably mounted in a carrier member 736 such that each planet gear member 737 meshingly engages the sun gear member 732, each planet gear 738 engages the outer, ring gear member 734 and the respective planet gear 737.

The input member 17 is secured to the carrier member 726 of the planetary gear set 720. The output member 19 is continuously connected with the ring gear member 734 of the planetary gear set 730.

This embodiment 710 also incorporates first and second motor/generators 780 and 782, respectively. The stator of the first motor/generator 780 is secured to the transmission housing 760. The rotor of the first motor/generator 780 is connected to the sun gear member 722 through offset gearing 790.

The stator of the second motor/generator 782 is also secured to the transmission housing 760. The rotor of the second motor/generator 782 is selectively alternately connectable to the carrier 736 or sun gear member 732 via the dog clutch 792 alternating between positions "A" and "B." The rotor of the second motor/generator 782 is connected to the dog clutch 792 through offset gearing 794.

A first torque transfer device, such as clutch 750, selectively connects the carrier member 726 with the carrier member 736. A second torque transfer device, such as clutch 752, selectively connects the ring gear member 724 with the sun gear member 732. A third torque transfer device, such as brake 755, selectively brakes the rotor of the motor/generator 780. A fourth torque transfer device, such as brake 757, selectively brakes the rotor of the motor/generator 782. The first, second, third and fourth torque transfer devices 750, 752, 755 and 757 and dog clutch 792 are employed to assist in the selection of the operational modes of the hybrid transmission 714.

The hybrid transmission 714 receives power from the engine 12, and also exchanges power with an electric power source 786, which is operably connected to a controller 788.

The operating mode table of FIG. 8b illustrates the clutching engagements, motor/generator conditions and output/input ratios for the five operating modes of the transmission 714. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2 and F3) as described previously.

As set forth above, the engagement schedule for the torque-transfer devices is shown in the operating mode table and fixed ratio mode table of FIG. 8b. FIG. 8b also provides an example of torque ratios that are available utilizing the ring gear/sun gear tooth ratios given by way of example in FIG. 8b. The $N_{R1}/N_{S1}$ value is the tooth ratio of the planetary gear set 720 and the $N_{R2}/N_{S2}$ value is the tooth ratio of the planetary gear set 730. Also, the chart of FIG. 8b describes the ratio steps that are attained utilizing the sample of tooth ratios given. For example, the step ratio between first and second fixed forward torque ratios is 1.49.

In the claims, the language "continuously connected" or "continuously connecting" refers to a direct connection or a proportionally geared connection, such as gearing to an offset axis. Also, the "stationary member" or "ground" may include the transmission housing (case) or any other non-rotating component or components. Also, when a torque transmitting mechanism is said to connect something to a member of a gear set, it may also be connected to an interconnecting member which connects it with that member.

While various preferred embodiments of the present invention are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

The invention claimed is:

1. An electrically variable transmission comprising:
   an input member to receive power from an engine;
   an output member;
   first and second motor/generators;
   first and second differential gear sets each having first, second and third members;
   said input member being continuously connected with at least one member of said gear sets, and said output member being continuously connected with another member of said gear sets, wherein said members of said at least one gear set continuously connected with said input shaft are characterized by an absence of continuous connectivity with ground;
   said first motor/generator being continuously connected with a member of said first or second gear set;
   said second motor/generator being continuously connected with a member of said second gear set which is different from said member continuously connected with said first motor/generator;
   a first torque transfer device selectively connecting a member of said first gear set with a member of said second gear set;
   a second torque transfer device selectively connecting a member of said first gear set with a member of said second gear set, the pair of members connected by said second torque transfer device being different from the pair of members connected by said first torque transfer device;
   a third torque transfer device selectively grounding a member of said first or second gear set;
   a fourth torque transfer device connected in parallel with one of said first and second motor/generators for selectively preventing rotation thereof;
   a fifth torque transfer device connected in parallel with the other of said first and second motor/generators for selectively preventing rotation thereof;
   wherein said first, second, third, fourth and fifth torque transfer devices are engageable to provide an electrically variable transmission with a continuously variable range of speed ratios and up to three fixed forward speed ratios.

2. The electrically variable transmission of claim 1, wherein said first and second differential gear sets are planetary gear sets.

3. The electrically variable transmission of claim 2, wherein carriers of each of said planetary gear sets are single-pinion carriers.

4. The electrically variable transmission of claim 2, wherein at least one carrier of said planetary gear sets is a double-pinion carrier.

5. The electrically variable transmission of claim 1, wherein said first, second, third, fourth and fifth torque transfer devices and said first and second motor/generators are operable to provide five operating modes in the electrically variable transmission, including battery reverse mode, EVT reverse mode, reverse and forward launch modes, continuously variable transmission range mode, and fixed ratio mode.

6. An electrically variable transmission comprising:
an input member to receive power from an engine;
an output member;
first and second motor/generators;
first and second planetary gear sets each having first, second and third members;
said input member being continuously connected with at least one member of said gear sets, and said output member being continuously connected with another member of said gear sets, wherein said members of said at least one gear set continuously connected with said input shaft are characterized by an absence of continuous connectivity with ground;
said first motor/generator being continuously connected with a member of said first or second gear set;
said second motor/generator being continuously connected with a member of said second gear set which is different from said member continuously connected with said first motor/generator; and
first, second, third, fourth and fifth torque transfer devices for selectively connecting said members of said first or second gear sets with a stationary member or with other members of said planetary gear sets, said first, second, third, fourth and fifth torque transfer devices being engageable singly and in combinations of two or three to provide an electrically variable transmission with a continuously variable range of speed ratios, at least one reverse speed ratio, and up to three fixed forward speed ratios between said input member and said output member.

7. The electrically variable transmission of claim 6, wherein said first torque transfer device selectively connects a member of said first planetary gear set to a member of said second planetary gear set.

8. The electrically variable transmission of claim 7, wherein said second torque transfer device selectively connects a member of said first planetary gear set to a member of said second planetary gear set, the pair of members connected by said second torque transfer device being different than the pair of members connected by said first torque transfer device.

9. The electrically variable transmission of claim 8, wherein said third torque transfer device selectively connects a member of said first or second planetary gear set with said stationary member.

10. The electrically variable transmission of claim 9, wherein said fourth torque transfer device is connected in parallel with one of said motor/generators for selectively preventing rotation thereof.

11. The electrically variable transmission of claim 10, wherein said fifth torque transfer device is connected in parallel with the other one of said motor/generators for selectively preventing rotation thereof.

12. The electrically variable transmission of claim 11, wherein carriers of each of said planetary gear sets are single-pinion carriers.

13. The electrically variable transmission of claim 11, wherein at least one carrier of said planetary gear sets is a double-pinion carrier.

14. An electrically variable transmission comprising:
an input member to receive power from an engine;
an output member;
first and second motor/generators;
first and second differential gear sets each having first, second and third members;
said input member being continuously connected with at least one member of said gear sets, and said output member being continuously connected with another member of said gear sets;
said first motor/generator being continuously connected with a member of said first gear set;
said second motor/generator being selectively alternately connectable with two of said members of said second gear set through a dog clutch;
a first torque transfer device selectively connecting a member of said first gear set with a member of said second gear set;
a second torque transfer device selectively connecting a member of said first gear set with a member of said second gear set, the pair of members connected by said second torque transfer device being different from the pair of members connected by said first torque transfer device;
a third torque transfer device selectively grounding a member of said first or second gear set;
a fourth torque transfer device connected in parallel with one of said first and second motor/generators for selectively preventing rotation thereof;
a fifth torque transfer device connected in parallel with the other of said first and second motor/generators for selectively preventing rotation thereof; and
wherein said first, second, third, fourth and fifth torque transfer devices are engageable to provide an electrically variable transmission with a continuously variable range of speed ratios and up to three fixed forward speed ratios.

* * * * *